United States Patent
Wikberg et al.

(10) Patent No.: US 10,894,866 B2
(45) Date of Patent: Jan. 19, 2021

(54) METHOD FOR ACTIVATING AND PRECIPITATING LIGNIN

(71) Applicant: Teknologian tutkimuskeskus VTT Oy, Espoo (FI)

(72) Inventors: Hanne Wikberg, Espoo (FI); Taina Ohra-Aho, Espoo (FI); Juha Leppävuori, Espoo (FI); Tiina Liitiä, Espoo (FI)

(73) Assignee: Teknologian tutkimuskeskus VTT Oy, Espoo, FL (US)

( * ) Notice: Subject to any disclaimer, the term of this patent is extended or adjusted under 35 U.S.C. 154(b) by 0 days.

(21) Appl. No.: 15/736,308

(22) PCT Filed: Jun. 23, 2016

(86) PCT No.: PCT/FI2016/050461
§ 371 (c)(1),
(2) Date: Dec. 14, 2017

(87) PCT Pub. No.: WO2016/207493
PCT Pub. Date: Dec. 29, 2016

(65) Prior Publication Data
US 2018/0179339 A1 Jun. 28, 2018

(30) Foreign Application Priority Data
Jun. 26, 2015 (FI) ...................................... 20155505

(51) Int. Cl.
*C07G 1/00* (2011.01)
*C08H 7/00* (2011.01)
(Continued)

(52) U.S. Cl.
CPC ................. *C08H 6/00* (2013.01); *C07G 1/00* (2013.01); *C08G 8/24* (2013.01); *C08G 8/38* (2013.01);
(Continued)

(58) Field of Classification Search
CPC .... C08H 6/00; C08H 8/00; C07G 1/00; C08L 97/005
See application file for complete search history.

(56) References Cited

U.S. PATENT DOCUMENTS 2,168,160 A * 8/1939 Hochwalt ................ C08G 8/38
527/403
2,840,614 A 6/1958 Goheen
(Continued)

FOREIGN PATENT DOCUMENTS

CA 2920702 A1 2/2015
CN 103080417 A 5/2013
(Continued)

OTHER PUBLICATIONS

Bodo Saake & Ralph Lehnen, "Lignin," in 21 Ullmann's Encyclopedia of Industrial Chemistry 21, published online 2007.*
(Continued)

*Primary Examiner* — Nicholas E Hill
(74) *Attorney, Agent, or Firm* — Laine IP Oy (57) ABSTRACT

According to an example aspect of the present invention, there is provided a method of producing reactive lignin from an alkaline lignin containing stream, such as black liquor, e.g. kraft lignin, by using thermal treatment with temperatures between 200 and 250° C. for simultaneous activation (for example by demethylation and/or demethoxylation) and precipitation of the lignin.

13 Claims, 3 Drawing Sheets

(51) Int. Cl.
*C08G 8/24* (2006.01)
*C08L 61/12* (2006.01)
*C08G 8/38* (2006.01)
*D21C 11/00* (2006.01)
*C08L 97/00* (2006.01)

(52) U.S. Cl.
CPC ............ *C08L 61/12* (2013.01); *C08L 97/005* (2013.01); *D21C 11/00* (2013.01); *D21C 11/0007* (2013.01)

(56) References Cited

U.S. PATENT DOCUMENTS

| | | | |
|---|---|---|---|
| 2,994,633 | A | 8/1961 | Clark |
| 4,250,088 | A | 2/1981 | Yang |
| 5,021,531 | A | 6/1991 | Schroeder |
| 2011/0297340 | A1 | 12/2011 | Kouisni et al. |
| 2016/0200754 | A1* | 7/2016 | Wittmann ............... C08H 6/00 530/500 |

FOREIGN PATENT DOCUMENTS

| | | | |
|---|---|---|---|
| CN | 104293258 A | 1/2015 | |
| EP | 1794363 B1 | 2/2012 | |
| WO | WO2012005677 A1 | 1/2012 | |
| WO | WO2012091906 A2 | 7/2012 | |
| WO | WO2014096544 A1 | 6/2014 | |
| WO | WO-2015018944 A1 * | 2/2015 | ............... C08H 6/00 |
| WO | WO2015018944 A1 | 2/2015 | |
| WO | WO2015025076 A1 | 2/2015 | |
| WO | WO2015044528 A1 | 4/2015 | |

OTHER PUBLICATIONS

Alén et al: Carbon dioxide precipitation of lignin from pine kraft black liquor. TAPPI, Nov. 1979, vol. 62, No. 11, pp. 108-110.
Beis et al: Fast pyrolysis of linings. Bioresources, vol. 5, No. 3, 2010, pp. 1408-1424.
Chengxia-Ren et al: Sulfur modification of kraft lignin and synthesis of resin. pp. 365-372.
Danielson et al: Kraft lignin in phenol formaldehyde resin. Part 1. Partial replacement of phenol by kraft lignin in phenol formaldehyde adhesives for plywood. Journal of Adhesion Science and Technology, vol. 12, No. 9, Apr. 2, 2012, pp. 923-939.
Enkvist et al: The Demethylation and degradation of lignin or spent liquors by heating with alkaline reagents. TAPPI, Feb. 1962, vol. 45, pp. 128-135.
Hu et al: Methods to improve lignin's reactivity as a phenol substitute and as replacement for other phenolic compunds: A brief review. BIORESOURCES.COM, 2011, vol. 6, No. 3, pp. 3515-3525.
Kang et al: Characterization of Hydrochars Produced by Hydrothermal Carbonization of Lignin, Cellulose, d-Xylose, and Wood Meal. Industrial & Engineering Chemistry Research, vol. 51, 2012, pp. 9023-9031.
Kim et al: Investigation of structural modification and thermal characteristics of lignin after heat treatment. International Journal of Biological Macromolecules, vol. 66, 2014, pp. 57-65.
Lake et al: SLRP—An Innovative Lignin-Recovery Technology.
Lake: SCCEBA Roundtable. Liquid Lignin Company, Feb. 6, 2013.
Ropponen et al: Solvent extraction as a means of preparing homogeneous lignin fractions. Holzforschung, vol. 65, 2011, pp. 543-549.
Stoklosa et al: Correlating lignin structural features to phase partitioning behavior in a novel aqueous fractionation of softwood Kraft black liquort. Green Chemistry, 2013, vol. 15, pp. 2904-2912.
Tomani: The lignoboost process. Cellulose Chemistry and Technology, Nov. 16, 2009, vol. 44, No. 1-3, pp. 53-58.
Velez et al: Solvated liquid-lignin fractions from a Kraft black liquor. Bioresource Technology, 2013, vol. 148, pp. 586-590.
Wikberg et al: Hydrothermal carbonization of pulp mill streams. Bioresource Technology, 2016, vol. 212, pp. 236-244.
Wu et al: Characteristics of demethylated wheat straw soda lignin and its utilization in lignin based resins. Cellulose Chemistry and Technology, 2001, vol. 35, No. 3-4, pp. 253-262.
Xinnan et al: Demethylated kraft lignin as a substitute for phenol in wood adhesive. Chemistry and Industry of Forest Products, Sep. 1995, vol. 15, No. 3, pp. 36-42.
Kang et al: Classified Separation of Lignin Hydrothermal Liquefied Products. Industrial & Engineering Chemistry Research, vol. 50, 19th Issue, pp. 11288-11296.

* cited by examiner

Figure 5:
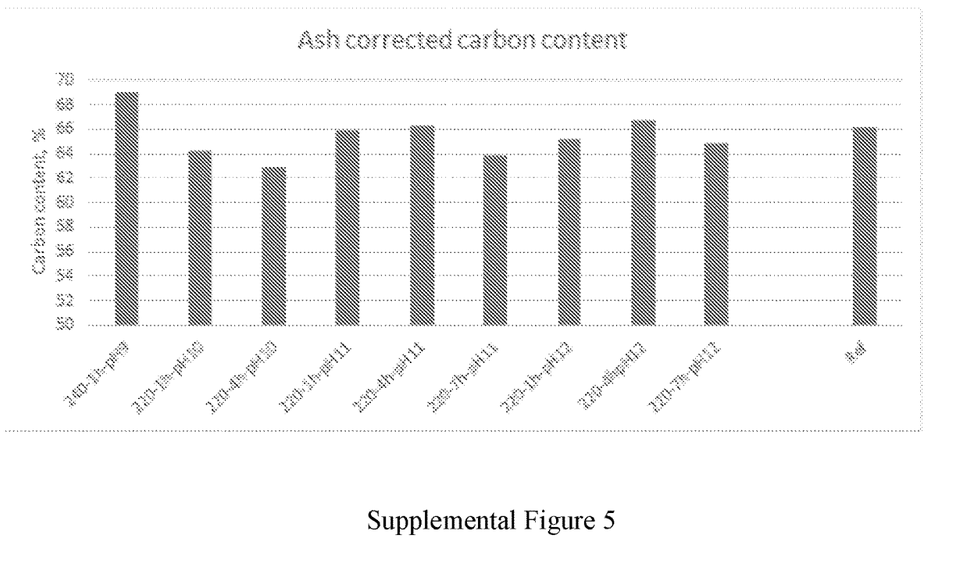

Supplemental Figure 5

METHOD FOR ACTIVATING AND PRECIPITATING LIGNIN

FIELD

The present invention relates to a method for a simultaneous activation and precipitation of lignin from an alkaline lignin containing stream, such as black liquor. More precisely, this invention relates to a lignin product obtained and the use of the product.

BACKGROUND

Black liquor is the by-product from alkaline pulping processes, such as kraft and soda pulping, where most of the lignin, but also some hemicelluloses and extractives are removed from the lignocellulosic feedstocks to free the cellulosic fibers for paper making. Black liquor contains more than half of the energy content of the wood fed into the digester, and pulp mills typically use black liquor as an energy source by burning it in the recovery boiler.

Lignin is the main organic component in black liquor (25-30%). It is aromatic biopolymer, and in addition to use as energy source, it could also find higher value uses as a sustainable bio based raw material in chemical industry. Therefore, lignin separation technologies have been recently developed, and some of them have been implemented into commercial scale. All presently available lignin separation technologies, such as LignoBoost, LignoForce and SLRP, are based on lignin precipitation by acidification using carbon dioxide. For example, the LignoBoost process comprises cooling of kraft black liquor at 30 to 45 wt-% dry matter content and precipitating of the lignin by lowering the pH to 9.5-10.5 by using $CO_2$ as acidifying agent. Precipitated lignin is then purified by using two-step acidic washing process described in EP 1794363. In the washing step the final pH is around 2.5. In principle, LignoForce process is rather similar, but black liquor is oxidized at 75° C. before acidification to improve the filtration properties. In SLRP process, the lignin is precipitated continuously in a column reactor at slightly higher temperature of 115° C. and pressure of 6.2 bar. The formed dense liquid-lignin droplets coalesce into a bulk liquid-lignin phase that is separated by gravity. The liquid lignin is reacted continuously with sulfuric acid to achieve a pH of 2-3 as in other processes. Currently, the precipitated lignin is mainly used as a fuel.

Other approaches for upgrading black liquor have also been investigated. WO 2012/091906 describes a process to reduce one or more insoluble solids from heat-treated black liquor comprising the steps of providing a black liquor stream and treating the black liquor at an increased temperature 250-300° C. In the process, lignin is depolymerized to lower molecular weight lignin compounds, such as phenolic oligomers and monomers. These compounds are dissolved, thus reducing the solids composition in the black liquor. Afterwards, the produced liquid including the degraded compounds can be separated and processed for use in downstream aromatic and other chemical processes. However, in the publication thermal treatment is used to degrade lignin in black liquor to lower molecular compounds. In the present invention the polymeric structure of precipitated lignin remains.

In the future, lignin by-products are produced in increasing amounts also from the manufacture of $2^{nd}$ generation biofuels. Additionally, lignin-rich side-streams originate from breweries. In both cases, lignin-rich brewers spent grain, and hydrolysis or stillage residues are already in solid form and no precipitation process is needed for recovery like in the delignifying pulping processes. However, due to the presence of other components besides lignin, some additional lignin extraction steps can be advantageous. This can lead to lignin solutions for which the lignin separation and activation process described here could be utilised.

Currently, 98% of the lignin produced worldwide is used as a fuel, but there is a need to utilize the side-stream lignin in higher value products than fuel, and various lignin valorisation possibilities are under extensive research. From those, lignin use in various thermoset resins, such as in phenol formaldehyde (PF), epoxy and polyurethane (PU) resins, is probably closest to the commercialisation. In PF resins, the reactivity of lignin is however limited compared to the phenols. When phenol reacts with formaldehyde, the reactive sites are at C2 (ortho), C4 (para) and C6 (ortho) positions, providing three sites for crosslinking of the aromatic ring, as illustrated in scheme 1. Unlike phenol, lignin is already crosslinked, and most of the ortho-positions next to unetherified phenolic units are methoxylated, retarding the lignin reactivity in PF resins. Degree of lignin methoxylation depends on feedstock, and is not significantly affected by the pulping process. Softwood lignin comprises mainly guaiacyl (G) type units with one methoxyl group in ortho position, whereas hardwood comprises also syringyl (S) type units, where both ortho-positions are methoxylated. In addition to S and G units, annual plants comprise also non-methoxylated para-hydroxyphenyl (H) units. As a result of this, relatively low proportions of the phenol can only be replaced by lignin without deterioration of the PF resin properties, especially the wet strength. Due to higher degree of methoxylation, especially the applicability of hardwood lignin is limited in PF resins.

(1)

-continued

To reach higher phenol replacement levels in PF resins and improve its utilization possibilities, lignin needs to be activated for improved reactivity. Several lignin activation methods, such as hydroxymethylation, phenolation, and demethylation, have been studied, but none of these has been cost-competitive or otherwise efficient enough.

SUMMARY OF THE INVENTION

The invention is defined by the features of the independent claims. Some specific embodiments are defined in the dependent claims.

According to a first aspect, it is provided herein a thermal treatment method for separating and activating lignin from lignin containing streams.

According to a second aspect, it is provided herein a simultaneous activation and precipitation method for producing reactive lignin, which has lower methoxyl content and specific structure and properties that can be altered by varying the process conditions.

According to a further aspect, the structure of separated lignin and the degree of activation is also dependent on the composition of the raw material stream, favouring especially alkaline lignin containing streams, such as black liquor from kraft or soda processes.

According to even further aspect, process yield can be increased and structure of the final lignin modified in alkaline raw materials by adding small amount of acid catalyst for adjusting the pH to desired level, by using acid catalyst such as $CO_2$ or $H_2SO_4$.

Suitable lignin containing streams are alkaline streams, where lignin is dissolved or colloidal (for example from alkaline pulping processes). Alternatively, non-alkaline or isolated lignins from other sources (as for example by-products from biofuel production or breweries) can be dispersed in an alkaline aqueous media.

The present invention provides means for enabling the utilization of lignin in higher value products than fuel, such as in PF and other phenolic resins, antioxidants, surface active dispersants, surfactants or chelates, UV-stabilizers, reinforcing fillers and pigments in various applications such as in tyre and other rubber products and composites making the process economically feasible. Alternatively, lignin can be used as a raw material in activated carbon manufacture.

These and other aspects, together with the advantages thereof over known solutions are achieved by the present invention, as hereinafter described and claimed.

Considerable advantages are obtained by means of the invention. High temperature with minor pH adjustment is utilized for lignin activation and precipitation instead of the traditional acidic precipitation. This leads to simultaneous lignin demethylation and/or demethoxylation, providing unique method for producing highly reactive lignin, for example for PF resin applications. The amount of the reactive sites of lignin increases significantly compared to the present commercial lignins precipitated with acid, making the lignin material more suitable for several applications. In addition to PF resins, the reactive lignin produced this way is suitable also for other phenolic resins, such as epoxy resins, enabling replacement of phenol. This lignin with higher proportion of reactive phenolic functionalities and unoccupied ortho-positions also provides better possibilities for lignin functionalization in general by means of chemical or enzymatic modification. In addition, the increased amount of phenolic units, especially formation of catechol type units, is expected to improve the antioxidative properties of the produced lignin. This can be utilized in several applications, such as in rubber and plastic products. Similarly the catechol units can improve metal chelation efficiency, and be utilized for example in waste water treatment. The structure of the produced lignin can be optimized in the process by varying process conditions so that the lignin material can be utilized as additive providing reinforcement, UV-stability, antioxidative properties, colouring and thermal stability for applications such as rubber, composites, inks and paints. Alternatively, it can be used as a raw material in activated carbon manufacture.

Next, the present technology will be described more closely with reference to certain embodiments.

EMBODIMENTS

The present technology describes a method of producing highly reactive lignin from lignin containing streams, such as black liquor, by thermal treatment and minor pH adjustment.

Figure 1:
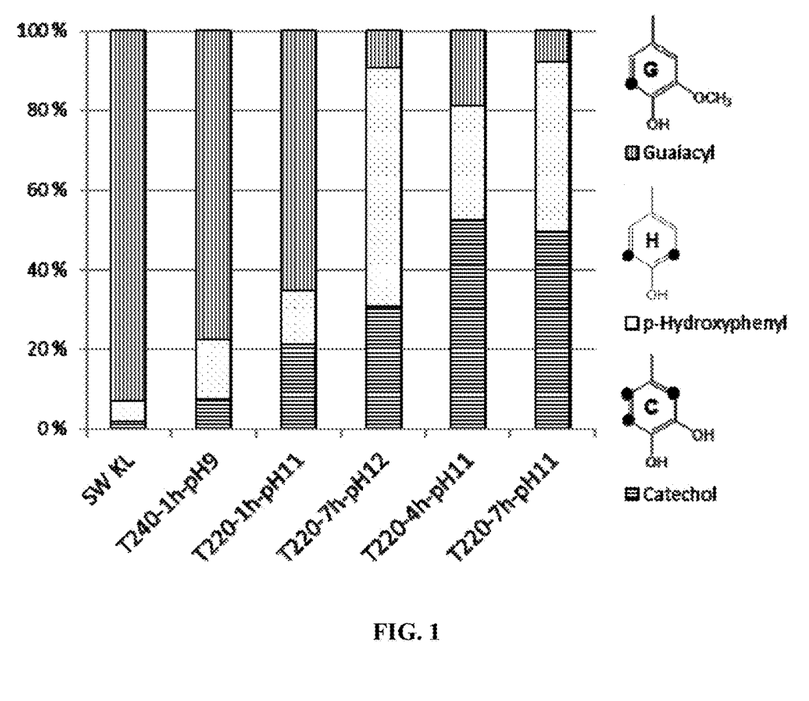

FIG. 1 illustrates an increase in the proportion of p-hydroxyphenyl and catechol units in comparison to reference SW (softwood) kraft lignin as a result of demethylation and demethoxylation reactions, in accordance with at least some embodiments of the present invention.

Figure 2:
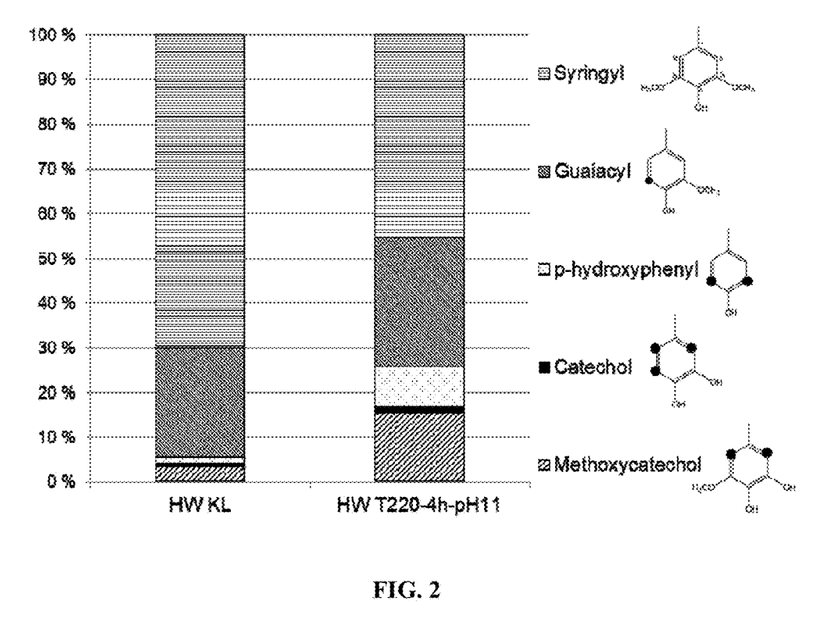

FIG. 2 illustrates an increase in the proportion of non-methoxylated p-hydroxyphenyl and catechol units, as well as less methoxylated guaiacyl and methoxycatechol units in comparison to reference HW (hardwood) kraft lignin as a result of demethylation and demethoxylation reactions, in accordance with at least some embodiments of the present invention.

Figure 3:
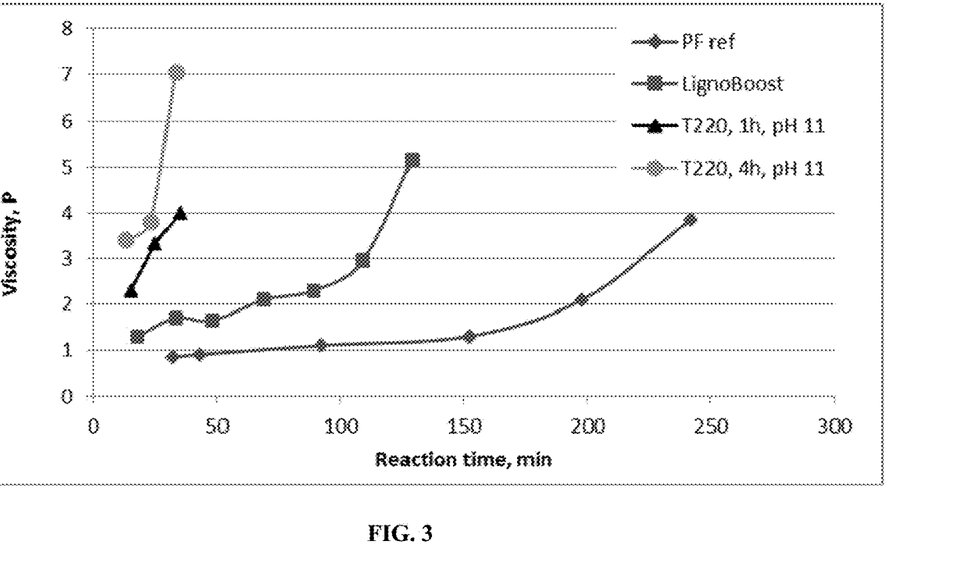

FIG. 3 illustrates the viscosity development in PF (phenol formaldehyde) resin synthesis, in accordance with at least some embodiments of the present invention.

Figure 4:
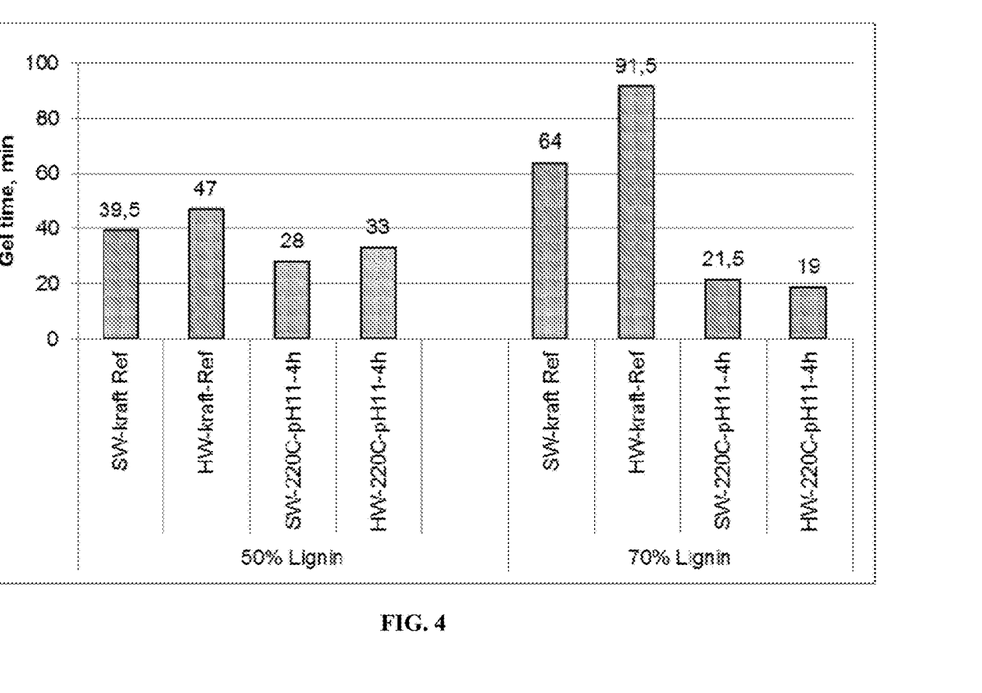

FIG. 4 illustrates resin curing at high phenol substitution levels according to the gel times, in accordance with at least some embodiments of the present invention.

According to one embodiment, lignin with highly reduced methoxyl content can be produced from alkaline lignin containing feedstock, obtained for example from alkaline pulping process, such as kraft black liquor, by using the method of the present invention as herein described, in which lignin is precipitated and activated simultaneously. However, the method can be utilized also for recovery of any other alkaline lignin containing stream.

Lignin precipitation accompanied by activation through demethylation and/or demethoxylation provides better means for utilisation of otherwise less reactive lignin for example in PF resins, and thus being especially beneficial for more methoxylated hardwood lignin separation.

According to one embodiment, the method comprises simultaneous activation and precipitation of lignin from lignin containing liquid stream by applying temperatures between 200 and 250° C. and a retention time between 0.5 and 10 h, more preferably 1-7 hours, and typically more than 1 hour.

Such thermal treatment increases the reactivity, i.e. the amount of reactive sites, of lignin.

According to another embodiment the method operates at a thermal temperature between 200 and 240° C., particularly at a temperature of between 220 and 240° C., during a retention time between 0.5 and 10 h, more preferably 1-7 hours, and typically more than 1 hour. Important features of the invention are that the temperature is not too high, while the retention time should be sufficiently long.

According to a further embodiment, the simultaneous activation and precipitation step is carried out without added demethoxylation and demethylation enhancing agent.

It has been observed by the inventors of the present invention that during lignin activation and precipitation, simultaneous demethylation and demethoxylation occurs, which create new reactive sites that are required especially in PF resin production for reactions with formaldehyde, but being beneficial also in more generally in chemical or enzymatic modification of lignin. Demethylation activates the C2 and C6 position of the aromatic ring, creating catechol and methoxycatechol units, particularly cathecol and methoxycatechol units, depending on the feedstock. Demethoxylation on the other hand activates one or two more ortho position of the lignin phenolic unit, again depending on the feedstock. Few possible examples are shown in scheme 2 below:

It is therefore possible to alter the structure of lignin, by first choosing a desired feedstock and then creating new reactive sites by using the method as herein described.

According to one embodiment, the lignin is activated by demethylation and demethoxylation reactions, which generate one or more additional reactive site(s) to C2, C3, C5 and/or C6 positions of the aromatic ring depending on raw material, as described in Scheme 2. The increase in the amount of reactive sites by the method as herein described is at least twofold, such as threefold, or even higher, compared to reactivity of commercial acid precipitated lignins (as shown later in Table 1).

According to a preferred embodiment, the obtained lignin material will have a methoxyl percentage of less than 10, typically 0.5-7, preferably 0.8-5.5.

According to another embodiment, the activation increases the proportion of non-methoxylated units in the lignin, such as p-hydroxyphenyl and catechol units of the lignin with SW lignin. With HW lignin also formation of methoxycatechols is possible, particularly of methoxycatechols.

According to a further preferred embodiment, the obtained lignin material will have an increased proportion of catechol- and p-hydroxyphenyl-type lignin units in its structure of at least 1 mmol/g and 0.5 mmol/g, respectively, preferably more than 1.0 mmol/g and at least 0.8 mmol/g, respectively.

The process is suitable for alkaline lignin containing streams where lignin is either dissolved or colloidal, or alternatively any type of lignin can be dispersed or dissolved in alkaline aqueous solution. Such streams can originate as such from kraft, and soda cooking processes. Alternatively, lignin can be hydrolysis lignin from $2^{nd}$ generation bioethanol residues or from breweries if dissolved or dispersed for example for lignin extraction.

Particularly, the selected stream originates from the kraft process, whereby kraft lignin is used.

One important feature of the invention is the dry content of alkaline lignin stream, such as the black liquor, which should be between 10 and 50 wt-%, preferably between 20 and 40 wt-%, most suitably between 20 and 30 wt-%.

According to one embodiment, the thermal treatment method self-generates a pressure between 15 and 40 bars when using the above described process conditions.

According to one embodiment the method is characterized by operating at an alkaline pH, such as between 9 and 13. Yield can be increased and structure of the final lignin can be modified in alkaline raw materials by adding acid catalyst for adjusting the pH to desired level.

According to one embodiment, the present method provides means for increased phenol replacement levels especially in PF resins, which are not achieved with conventional lignins.

According to a further embodiment, after the activation and precipitation, the lignin material can be purified by acidic washing.

According to even further embodiment, the method of the present invention includes the following steps:
- placing black liquor from softwood kraft pulping process having dry content of 20-40 wt-%, preferably of 20-30 wt-%, into a reactor,
- adjusting pH of the black liquor between 9-12 by using a pH lowering agent,
- thermally treating the pH-adjusted black liquor in temperatures between 220° C. and 240° C. under pressures between 15-40 bars for 1 to 7 hours, providing fractions of activated and precipitated lignin and remaining liquid,
- separating the activated and precipitated lignin fraction from the remaining liquid fraction in a centrifuge,
- purifying the lignin by using acidic washing, and
- drying the lignin product.

In addition, a lignin material having low methoxyl content and increased proportion of for example catechol and p-hydroxyphenyl type lignin units in SW lignin structure, and additionally also methoxycatechol structures in HW lignin structure, particularly methoxycatechol structures, belongs to the scope of the present invention. Such lignin material may be used for example in phenol formaldehyde resin applications.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in generating highly reactive lignin, which makes the lignin material more suitable for several industrial applications. Highly reactive lignin can be used for example for phenol formaldehyde (PF) resins for replacement of phenol. Demethoxylation increases the amount of reactive sites in aromatic ring and demethylation also creates new phenolic units that can be utilized in phenolic epoxy resins. This lignin with higher proportion of reactive phenolic functionalities and unoccupied ortho-positions also provides better possibilities for lignin functionalization by means of chemical or enzymatic modification. In addition, the increased amount of phenolic units, especially formation of catechol type units, is expected to improve the antioxidative properties of the produced lignin. This can be utilized in several applications, such as in rubber and plastic products. Similarly the catechol units can improve metal chelation efficiency, and be utilized e.g. in waste water treatment. Other suitable application areas are found among dispersants and surfactants. The structure of the produced lignin can also be optimized in the process by varying process conditions so that the lignin may be used as replacement of fossil-based carbon black, as additive providing reinforcement, UV-stability, antioxidative properties, colouring and thermal stability, and in conventional applications using carbon black, such as rubber, composites, inks and paints. Alternatively, it can be used as a raw material in activated carbon manufacture.

EXAMPLES

Example 1—General Method

Raw Material
  Black liquor from softwood and hardwood kraft pulping process
  Dry content of the raw material: 10-50 wt-%, Trials done at 20 wt-% and 30 wt-%

Method
  Temperature of 200 to 250° C.
  Residence time 30 min-10 h
  Self-generated pressure 15-40 bar
  pH alkaline 9-13
  Product purification after the activation and precipitation: the lignin material is purified by acidic washing In this example, black liquor from softwood kraft pulping process having dry content of 20-30 wt-% was placed into a reactor and pH was adjusted between 9-12 using $CO_2$ as a pH lowering agent. Then the black liquor was thermally treated in the temperatures between 220 and 240° C. under pressures between 15-40 bars for 1 to 7 hours. Then the activated and precipitated lignin was separated from the remaining liquid in a centrifuge. The separated lignin was purified using acidic washing and dried. Hardwood black liquor was treated similarly at 220° C. and pH 11 for 4 h.

Table 1 shows the amounts of different phenolic hydroxyl group species (mmol/g) and percentage of methoxyl group in softwood lignin samples after the thermal treatment with varying temperature, retention time and pH, determined by $^{31}P$ NMR. Significantly lower amount of methoxylated guaiacyl units and higher content of non-methoxylated catechol and p-hydroxyphenyl type units was detected together with lower methoxyl content compared to a to typical industrial softwood kraft lignins recovered by traditional acidic precipitation. Total content of phenolic hydroxyl and carboxylic acid groups was also higher, whereas the content of aliphatic hydroxyl groups was lower. Similarly, the demethylation/demethoxylation was evident with hardwood lignin (Table 1). The total amount of phenolic units was significantly increased together with decreased methoxyl content compared to the reference hardwood kraft lignin that was recovered by traditional acid precipitation. The amount of non-methoxylated phenolic units was comparable with the thermally separated softwood lignin.

TABLE 1

| mmol/g | Aliphatic OH | Carboxylic acid | Condensed (+syringyl) | Guaiacyl | Catechols | p-OH-phenyl | Phenolic OH | Total OH | % OCH3[c] |
|---|---|---|---|---|---|---|---|---|---|
| Softwood | | | | | | | | | |
| T240-1h-pH 9* | 0.5 | 0.8 | 2.1 | 0.7 | 1.5 | 1.0 | 5.3 | 6.5 | 4.3 |
| T220-1h pH 11 | 0.7 | 0.8 | 2.7 | 0.9 | 1.9 | 1.3 | 6.7 | 8.3 | 4.3 |
| T220-4h-pH 11 | 0.5 | 0.9 | 2.3 | 1.0 | 1.6 | 1.5 | 6.4 | 7.8 | 1.4 |
| T220-7h-pH 11 | 0.4 | 0.9 | 2.1 | 0.7 | 1.5 | 1.5 | 5.7 | 7.0 | 1.0 |
| T220-7h-pH 12 | 0.4 | 0.96 1.0 | 2.2 | 0.7 | 1.7 | 1.5 | 6.2 | 7.5 | 0.8 |
| Reference lignins: | | | | | | | | | |
| LignoBoost ™ | 1.7 | 0.4 | 2.0 | 2.3 | 0.00 | 0.2 | 4.4 | 6.5 | 12.9 |
| Indulin AT[a] | 2.0 | 0.2 | 1.6 | 2.3 | | 0.3 | 4.3 | 7.6 | 14.6 |
| Hardwood | | | | | | | | | |
| T220-4h-pH 11 | 0.5 | 0.8 | 3.4 | 0.7 | 2.2 | 0.8 | 7.2 | 8.5 | 5.1 |
| Reference lignin: | | | | | | | | | |
| HW KL[b] | 1.5 | 0.6 | 2.4 | 0.5 | 0.3 | 0.2 | 3.4 | 5.5 | 17.4 |
| Kraft Lignin[a] | 0.9 | 0.2 | | | | | 2.8 | 3.8 | |

*not fully soluble
[a]Beis S H (2010) Fast pyrolysis of lignin. BioResources 5(3) 1408-1424
[b]Hardwood kraft lignin precipitated from black liquor at pH 2.5 with hydrochloric acid
[c]All values are measured according to Pregl.

Table 2 shows the average molar mass values of softwood lignins determined by SEC in 0.1M NaOH relative to the polystyrene sulphonate standards. Results show that the polymeric nature of lignin is retained, and no lignin degradation was detected. With increasing reaction time and temperature, some condensation takes place, even increasing lignin molecular weight. In optimal reaction conditions, the molar mass is comparable to the typical industrial softwood kraft lignins.

TABLE 2

| | Mn | MW | PD |
|---|---|---|---|
| Softwood | | | |
| T240-1h-pH 9 | 2540 | 6150 | 2.4 |
| T220-1h pH11 | 2420 | 4190 | 1.7 |
| T220-4h-pH11 | 2620 | 5020 | 1.9 |
| T220-7h-pH11 | 2600 | 5240 | 2.0 |
| T220-7h-pH12 | 2580 | 4870 | 1.9 |
| Reference lignins: | | | |
| LignoBoost ™ | 2290 | 4450 | 1.9 |
| Indulin AT[a] | 1580 | 3410 | 2.2 |

TABLE 2-continued

|  | Mn | MW | PD |
|---|---|---|---|
| Hardwood | | | |
| HW KL[b] | 1260 | 2310 | 1.8 |
| T220-4h-pH11 | 2100 | 3330 | 1.6 |

[a] J. Ropponen, L. Räsänen, S. Rovio, T. Ohra-aho, T. Liittia, H. Mikkonen, D. van de Pas, T. Tamminen, Solvent extraction as a means of preparing homogenous lignin fraction. Holzforschung 65 (2011), 543-549.
[b] Hardwood kraft lignin precipitated from black liquor at pH 2.5 with hydrochloric acid Example 2—Elemental Analysis The elemental composition of the lignin products was analyzed and compared with the industrial lignins. Feedstock was in most cases softwood kraft lignin. It can be seen from Table 3 that the elemental composition is rather similar to typical industrial softwood kraft lignins.

TABLE 3

|  | % dry | | | | | | |
|---|---|---|---|---|---|---|---|
|  | C % | H % | N % | O % | S % | Ash % | Na % |
| Softwood: | | | | | | | |
| T220-1h-pH 12 | 63.9 | 5.2 | n.d. | n.d. | 2.1 | 2.0 | n.d. |
| T220-1h-pH 10 | 63.3 | 5.0 | n.d. | n.d. | 2.3 | 1.4 | n.d. |
| T220-4h-pH 12 | 65.1 | 4.9 | n.d. | n.d. | 2.2 | 2.5 | n.d. |
| T220-4h-pH 10 | 61.3 | 4.4 | n.d. | n.d. | 2.5 | 2.5 | n.d. |
| T240-1h-pH 9 | 66.6 | 4.6 | 0.2 | 23.3 | 1.8 | 3.5 | 0.8 |
| T220-1h pH 11 | 63.5 | 4.9 | 0.1 | 26.0 | 2.5 | 3.6 | 1.1 |
| T220-4h-pH 11 | 64.1 | 4.5 | 0.1 | 24.2 | 2.7 | 3.2 | 0.9 |
| T220-7h-pH 11 | 62.1 | 4.2 | 0.1 | 23.6 | 2.4 | 2.8 | 0.6 |
| T220-7h-pH 12 | 62.9 | 4.4 | 0.1 | 23.4 | 2.5 | 3.0 | 0.7 |
| Reference lignins: | | | | | | | |
| LignoBoost ™[a] | 63.6-66.2 | 5.7-6.2 | 0.1-0.2 | 25.9-27.5 | 1.8-3.2 | 0.2-1.4 | 0.17 |
| Indulin AT[b] | 64.5 | 5.4 | 1.0 | 24.7 | 1.9 | 2.4 | 0.8 |
| HW KL[b] | 64.5 | 6.2 | 0.3 | 30.2 | 2.6 | 2.1 | n.d. |
| Hardwood: | | | | | | | |
| T220-4h-pH 11 | 66.9 | 5.0 | 0.2 | n.d. | 2.1 | 1.7 | n.d. |

[a] Tomani, P (2010) The LignoBoost process. Chellulose Chem. Technol., 44 (1-3), 53-58
[b] Beis S H (2010) Fast pyrolysis of lignin. BioResources 5(3) 1408-1424
n.d. = not determined Example 3—Viscosity Development in Phenol Formaldehyde Resin Synthesis PF resin synthesis were performed using 100% phenol (PF Ref), and substituting 50% phenol with softwood LignoBoost lignin or thermally separated and activated lignins (220° C., 1 h, pH 11 and 220° C., 4 h, pH 11). Formaldehyde/phenol ratio of 2 and NaOH/phenol ratio of 0.55 was used. All the other chemicals besides formaldehyde were first mixed and reaction temperature was increased to 55-60° C. Formaldehyde was then added during 10 min, resulting in temperature increase to 70-85° C. The actual condensation phase was carried out at 85° C. and the reaction was followed according to the viscosity.

As shown in FIG. 3 all lignins had faster viscosity increase and shorter reaction time due to already crosslinked polymeric nature compared to phenol. The reactions of thermally separated and activated lignin were faster compared to LignoBoost, supporting faster crosslinking due to the higher amount of reactive sites. As shown in Table 2, the initial molar mass was comparable with LB, and even lower for the sample T220, 1 h, pH 11.

Example 4: Resin Curing at High Phenol Substitution Levels According to the Gel Times PF resin syntheses were performed by substituting 50% and 70% of phenol with lignin. Commercial softwood kraft lignin and hardwood kraft lignin precipitated at pH 2.5 were compared with the thermally separated and activated softwood and hardwood lignins (220° C., 4 h, pH 11). Formaldehyde/phenol ratio of 2 and NaOH/phenol ratio of 0.55 was used according to Danielson et al (1998). For the lignin part, formaldehyde dosage was calculated according to the reactive functionalities detected by $^{31}P$ NMR. After complete dissolution of lignin into alkali, the formaldehyde was added at 55-60° C. After that the reaction temperature was increased to 80-85° C. for the actual condensation phase. The reaction was terminated when the target viscosity of 350-450 cP was reached.

The curing rate of resins was evaluated according to gel times. An in-house method was used, where a glass test tube with 5 g of the resin was immersed in water bath at 100° C. and the resin was stirred with a glass rod until the tube was lifted with the rod.

As shown in FIG. 4 all thermally separated and activated lignins had shorter gel times, indicating faster curing rate compared to the acid precipitated reference lignins. Better reactivity of thermally separated and activated lignins was even more emphasised at higher phenol substitution level of 70%. The curing rate of reference lignins was significantly reduced at 70% substitution level unlike with the thermally activated lignins. After thermal activation, the reactivity of softwood and hardwood lignins was comparable. With reference lignins, the reactivtity of hardwood lignin is lower compared to the softwood lignin due to the higher degree of methoxylation.

CITATION LIST

Patent Literature

EP 1794363
WO 2012/091906

Non Patent Literature

Beis, S. H., Mukkamala, S., Hill, N., Joseph, J., Baker, C., Jensen, B., Stemmler, E. A., Wheeler, M. C., Frederick, B. G., van Heiningen, A., Berg, A. G., DeSisto W. J., 2010, Fast pyrolysis of lignin. BioResources 5(3) 1408-1424

Danielson & Simonson, 1998, Kraft lignin in phenol formaldehyde resin. Part 1. Partial replacement of phenol by kraft lignin in phenol formaldehyde adhesives for plywood *J. Adhesion Sci. Technol., Vol.* 12(9), 923-939.

Ropponen, J., Räsänen, L., Rovio, S., Ohra-aho, T., Liitiä, T., Mikkonen, H., van de Pas, D., Tamminen, T., 2011, Solvent extraction as a means of preparing homogenous lignin fraction. Holzforschung 65, 543-549

Tomani P., 2010, *The LignoBoost process*, Cellulose Chem. Technol., 44 (1-3), pp. 53-58.

The invention claimed is:

1. A method for activating and recovering lignin from an alkaline lignin-containing feedstock by a thermal treatment, the method comprising:
   simultaneously activating and precipitating the lignin in the feedstock by a thermal treatment being carried out on the feedstock having a dry matter content of between 10 and 40 wt-% and a pH of 10-12, without added demethylation and demethoxylation enhancing agents, and at a self-generated pressure, by applying temperature between 200 and 220° C. and a retention time between 1 and 7 hours to the feedstock, wherein the pH, temperature, and retention time are selected along with the self-generated pressure to provide simultaneous demethylation and demethoxylation of the lignin.

2. The method of claim 1, wherein the alkaline lignin-containing feedstock is from an alkaline pulping process.

3. The method of claim 1, wherein the dry content of the alkaline lignin-containing feedstock during the activation and precipitation step is between 20 and 40 wt-%.

4. The method of claim 1, comprising operating at a self-generated pressure between 15 and 40 bars.

5. The method of claim 1, comprising operating the thermal treatment step using a retention time of 1 to 4 hours.

6. The method of claim 1, wherein, after the activation and precipitation, the lignin is purified by acidic washing.

7. The method of claim 1, further comprising removing excess filtrate, whereby the lignin is obtained.

8. The method of claim 1, wherein a number of reactive sites of the activated lignin for curing reactions with aldehydes is increased at least 1.5 fold compared to a number of reactive sites of a lignin in untreated feedstock, and wherein the method further comprises substituting the recovered lignin for phenol in a curing reaction with an aldehyde.

9. The method of claim 1, wherein the activated lignin comprises a methoxyl percentage of from 0.5-7 mmol/g.

10. The method of claim 1, wherein the activated lignin comprises at least 1 mmol/g of non-methoxylated catechol-type lignin units and at least 0.5 mmol/g of p-hydroxyphenyl-type lignin units.

11. The method of claim 10, wherein the activated lignin comprises 1.5-1.9 mmol/g of non-methoxylated catechol-type lignin units and 1.0-1.5 mmol/g of p-hydroxyphenyl-type lignin units.

12. The method of claim 1, wherein the activated lignin comprises 0.7-1.0 mmol/g methoxylated guaiacyl units.

13. The method of claim 1, wherein a number of reactive sites of the activated lignin for a reaction with formaldehyde for formation of a phenol formaldehyde resin is increased compared to a number of reactive sites of a lignin in feedstock untreated by the process of claim 1, and wherein the method further comprises reacting the activated lignin with formaldehyde to form the phenol formaldehyde resin.

* * * * *